Aug. 14, 1923.

W. D. DRUMMOND

SAW GUARD

Filed June 20, 1922

1,464,924

2 Sheets-Sheet 1

INVENTOR.
William D. Drummond
BY Horatio E. Bellows
ATTORNEY

Aug. 14, 1923.

W. D. DRUMMOND

SAW GUARD

Filed June 20, 1922 2 Sheets-Sheet 2

1,464,924

INVENTOR.
William D. Drummond
BY Horatio E. Bellows
ATTORNEY

Patented Aug. 14, 1923.

1,464,924

UNITED STATES PATENT OFFICE.

WILLIAM D. DRUMMOND, OF NEW YORK, N. Y.

SAW GUARD.

Application filed June 20, 1922. Serial No. 569,707.

*To all whom it may concern:*

Be it known that I, WILLIAM D. DRUMMOND, a citizen of the United States, residing at New York, in the county of New York and State of New York, have invented certain new and useful Improvements in Saw Guards, of which the following is a specification.

My invention relates to guards for circular saws, and the essential objects of my invention are to enable the guard to be utilized upon either a stationary or swinging saw or saws; to enable the guard to be mounted independently of the saw frame; to protect the operator at all times including the period of the sawing operation, and to attain these ends in a compact, inexpensive and automatically operable structure.

To the above ends essentially my invention consists in such parts and in such combinations of parts as fall within the scope of the appended claims.

Figure 1:
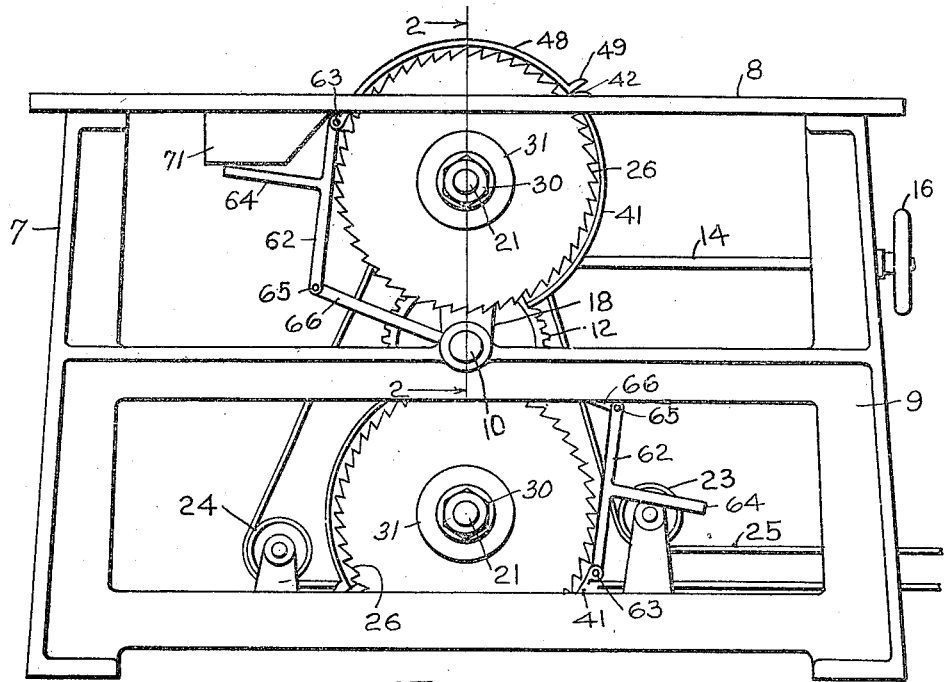
Figure 2:
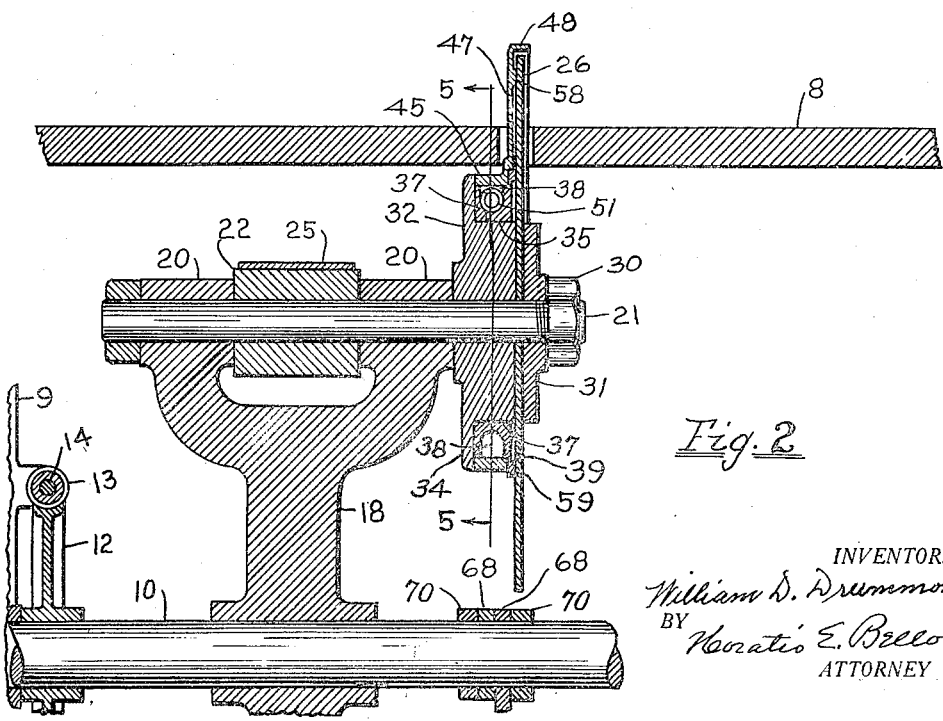
Figure 3:
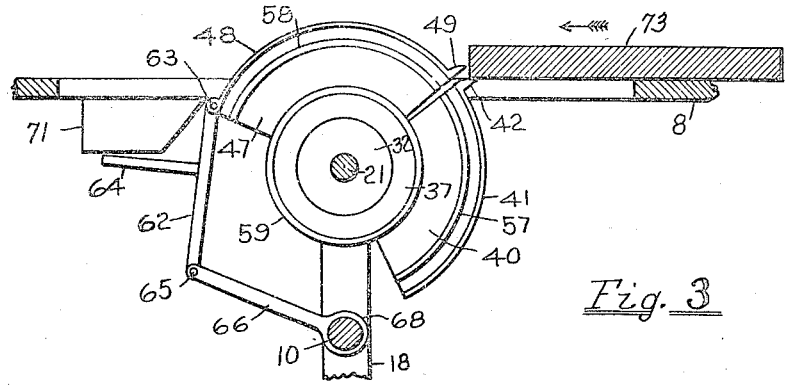
Figure 4:
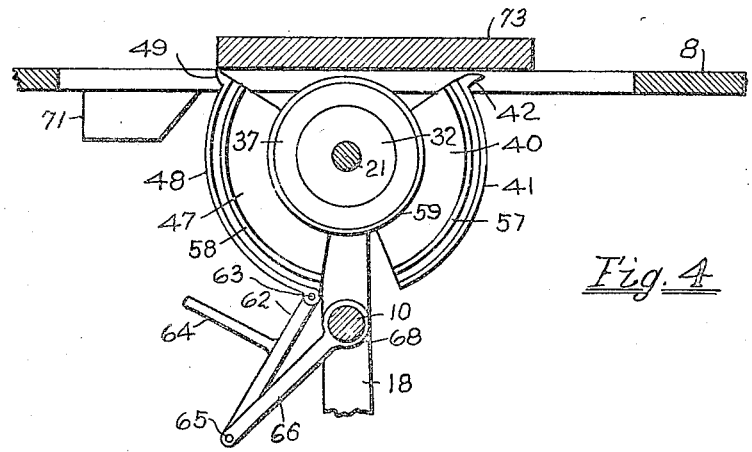
Figure 5:
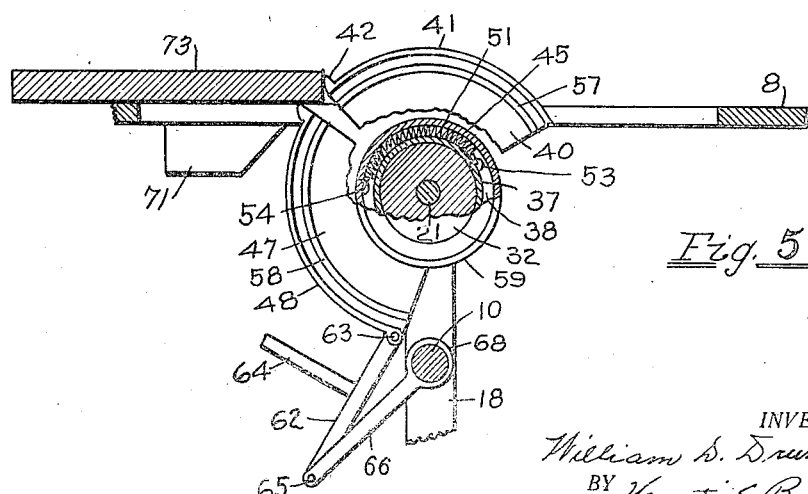

In the accompanying drawings which form a part of this specification,

Figure 1 is a side elevation of a saw frame carrying saws mounted in my guard,

Figure 2, a section of the same on line 2—2 of Figure 1,

Figure 3, a front elevation, partially in section of one of the guards in normal position, Figure 4, a like elevation of the same during a portion of the sawing operation, and Figure 5, a front elevation of one of the guards, partially in section on line 5—5 of Figure 2, near the close of the sawing operation.

Like reference characters indicate like parts throughout the views.

In the drawings 7 is any usual or convenient saw frame, including the table 8 and framework 9 in which is mounted the shaft 10 carrying the worm wheel 12 engaged by the worm 13 of shaft 14 also mounted in the framework and movable by the wheel 16, all as usual. The common spindle arm 18 is intermediate its length fast to the shaft 10 having upon its opposite ends the bearings 20 for the spindles or arbors 21 carrying the driving rolls 22. 23 and 24 are the guide and tension rolls of the driving belt 25 adapted to engage either of the rolls 22 to rotate its saw 26. It is in conjunction with the described or other familiar saw frames and parts that my invention will be herein described.

Each spindle has upon its end the usual nut 30. The outer and inner collars 31 and 32 embrace the saw 26. The latter collar has a peripheral flanged portion 34 forming a resultant seat 35 for an annular circularly movable hub 37 of rectangular cross section provided with an annular recess 38 and a peripheral flange 39. Integral with the hub is a segmental plate 40 provided with a laterally directed peripheral flange 41 terminating in a lip 42 upon one end.

Rotatably mounted on the hub 37 and closing the recess or channel 38 is a ring or hub 45 slidably engaging the flanges 34 and 39 and carrying an integral segmental plate 47 having a lateral peripheral flange 48 terminating in a lip 49.

In the recess 38 is a helical retractile spring 51 attached at its ends to pins 53 and 54 fast in the members 37 and 45 respectively. This spring serves to normally maintain in contact with each other the two adjacent edges of the segmental plates. In this instance the plates 40 and 47 have internal arcuate marginal bearing or spacing ribs 57 and 58 respectively; and the circular flange 39 has a circular bearing rib 59. These ribs are slidably engaged by the saw.

The following means is convenient for preventing excessive travel of the plates 47 toward the work, and to keep the lip 49 in alignment with the top of the table. A link 62 is pivoted by a pin 63 to the end of a plate 47 opposite the lip 49 and has an intermediate lateral finger 64. A link is pivoted by a pin 65 to an arm 66. An arm is pivotally attached to the saw frame or some part carried thereby. In this instance the arms are loosely pivoted to the shaft 10 through an integral ring portion 68. The latter portions are loosely embraced by collars 70 fast to the shaft 10. In Figure 1 a finger 64 is shown stopped at its extreme of travel by contact with a projecting portion 71 of the machine frame. To illustrate the action of the guards a block to be sawed 73 is shown in Figures 3, 4 and 5, as moving in the direction of the arrow, and which impels the plate 47, and through the spring 51 causes the plate 40 to closely follow the block thus continuously housing the saw teeth by the flanges 48 and 41. When it is desired to use the lower of the two saws it will be found that the guard structures lend themselves without removal from their positions upon their respective saw spindles to such reversal when the member 18 is rotated or swung upon its axis. This is one important advantage of the non fixed character of my construction.

The link 62 and the arm 66 constitute an anchoring device to keep the guard member 47 from rotating with the saw. The stop 64 serves only as a stop for the guard when the saw is at an angle of 45° or any other angle past the center.

It is to be noted that the guard is mounted on the arbor of the saw and, consequently, is under the contact of the friction between the collar 32 and the hub 37 so that the parts 40 and 47 are normally in the position in which they are shown in Figures 1 and 3.

The part 47 is moved in the direction of the passage of the material being cut by the pressure of such material upon the lip 49 and is moved thereby until the said lip is caused to extend below the upper face of the table 8, as seen in Figure 4. the member 40 being held down by the pressure of the material upon the lip 42, as seen in Figure 3, and when the rear end of said material has passed said lip the guard member 40 follows the material being moved, by the action of the spring 51, the said member 40 following the end of the material, as seen in Figure 5, thus guarding the saw, so that the teeth thereof are never exposed and, hence, all danger to the operator is avoided. After the material has been cut and passed beyond the lip 49, the parts are automatically returned to normal position, that seen in Figures 1 and 3, by the return of the saw to its normal position, ready for a similar operation on the next piece of material.

It will be understood that my device is successfully operable without the anchoring devices 62 and 66 or any other device of a similar character, and in instances where only a single stationary saw is mounted in the frame the anchoring mechanism is customarily omitted. The auxiliary mechanism has its chief value in conjunction with the use of a plurality of saws movable relatively to each other or with a single non-stationary saw, such for instance as universal saws.

I claim:—

1. A saw and its arbor, and a guard for the saw mounted on said arbor and comprising two independently movable members frictionally held in normal position and both mounted on the same arbor.

2. A saw and its arbor, a guard for the saw mounted on said arbor and comprising two independently movable members frictionally held in normal position and both mounted on the same arbor, and an anchoring device for one of said members.

3. A saw and its arbor, a guard for the saw mounted on said arbor and comprising two independently movable members frictionally held in normal position and both mounted on the same arbor, and an anchoring device for one of said members, said anchoring device being provided with a stop member.

4. An oscillatorily-mounted saw, and a guard therefor comprising two members both mounted upon the said arbor and oscillatory with the saw, both movable together in one direction and independently of each other in the other direction.

5. An oscillatorily-mounted saw, a guard therefor mounted upon the said arbor and oscillatory with the saw, and an anchoring device for said guard to prevent its rotation with the saw.

6. An oscillatorily-mounted rotary cutter, and a guard therefor, comprising two members, one of said members movable relatively to the other and both mounted on the saw arbor.

7. An oscillatorily-mounted rotary cutter, a guard therefor, comprising two members, one of said members movable relatively to the other and both mounted on the saw arbor, an anchoring device for one member, and a spring for returning the other member to its normal position.

8. In a circular saw guard, a hub provided with a recess, a segmental plate upon the hub, a ring rotatably mounted on the hub enclosing the recess, a segmental plate on the ring, guard flanges on the plates, lips on the adjacent ends of the flanges, and a spring in the recess fast at its opposite ends to the hub and collar.

9. A saw and its arbor, and a guard for said saw comprising two members mounted independently of each other on the arbor of the saw and movable in one direction with each other and in the other direction independently of each other.

10. A saw and its arbor, a guard for said saw comprising two members mounted independently of each other on the arbor of the saw and movable in one direction with each other and in the other direction independently of each other, means for anchoring one of said members, and a spring acting on the other member to move it in one direction.

11. A saw and its arbor, a guard for said saw comprising two members mounted independently of each other on the arbor of the saw and movable in one direction with each other and in the other direction independently of each other, means for anchoring one of said members, a spring acting on the other member to move it in one direction, and friction means for returning both of said members to their normal position.

12. A saw and its arbor, a guard for said saw comprising two members mounted independently of each other on the arbor of the saw and movable in one direction with each other and in the other direction independently of each other, means for anchoring one of said members, a spring acting on the other member to move it in one direction, and friction means for returning both of said members to their normal position, said saw being oscillatorily-mounted.

In testimony whereof I have affixed my signature.

WILLIAM D. DRUMMOND.